United States Patent [19]
Furno

[11] 3,794,283
[45] Feb. 26, 1974

[54] EXTENSIBLE FRAME

[76] Inventor: Harold R. Furno, 1144 W. "B" St., Ontario, Calif. 91762

[22] Filed: Dec. 19, 1972

[21] Appl. No.: 316,449

Related U.S. Application Data

[63] Continuation of Ser. No. 73,794, Sept. 21, 1970, abandoned.

[52] U.S. Cl. ............... 248/276, 143/47 K, 248/421
[51] Int. Cl. .......................... A47f 5/08, E04h 12/10
[58] Field of Search ... 248/277, 276, 278, 421, 157; 143/47 R, 47 K; 74/103, 520, 521

[56] References Cited
UNITED STATES PATENTS

| | | | |
|---|---|---|---|
| 385,831 | 7/1888 | Adelsperger | 248/421 X |
| 483,777 | 10/1892 | Bredsvold | 248/421 |
| 533,009 | 1/1895 | Holland et al. | 248/376 X |
| 1,763,244 | 6/1930 | Mattison | 143/47 R |
| 2,007,563 | 7/1935 | Koning | 143/47 K UX |
| 2,440,096 | 4/1948 | Jury | 248/421 |

FOREIGN PATENTS OR APPLICATIONS
856,345   12/1960   Great Britain .................... 74/103

Primary Examiner—J. Franklin Foss
Attorney, Agent, or Firm—Boniard I. Brown

[57] ABSTRACT

An extensible frame having a pair of rigid end members disposed on a common axis and three articulated arms extending between the members in intersecting planes containing the common axis and hinged to the members in a manner which relative translational movement of the members toward and away from one another along the common axis and restrains the member against all other relative movement. The frame is capable of various uses such as supporting an object for horizontal or vertical movement, an adjustable instrument support, an erectable frame for a building structure, and others.

16 Claims, 9 Drawing Figures

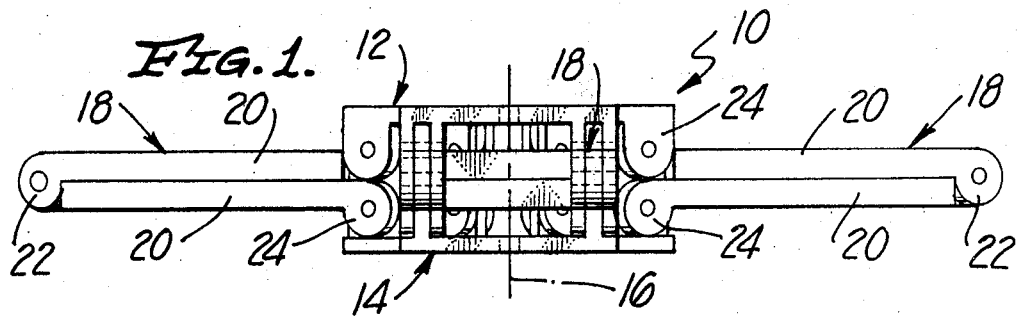
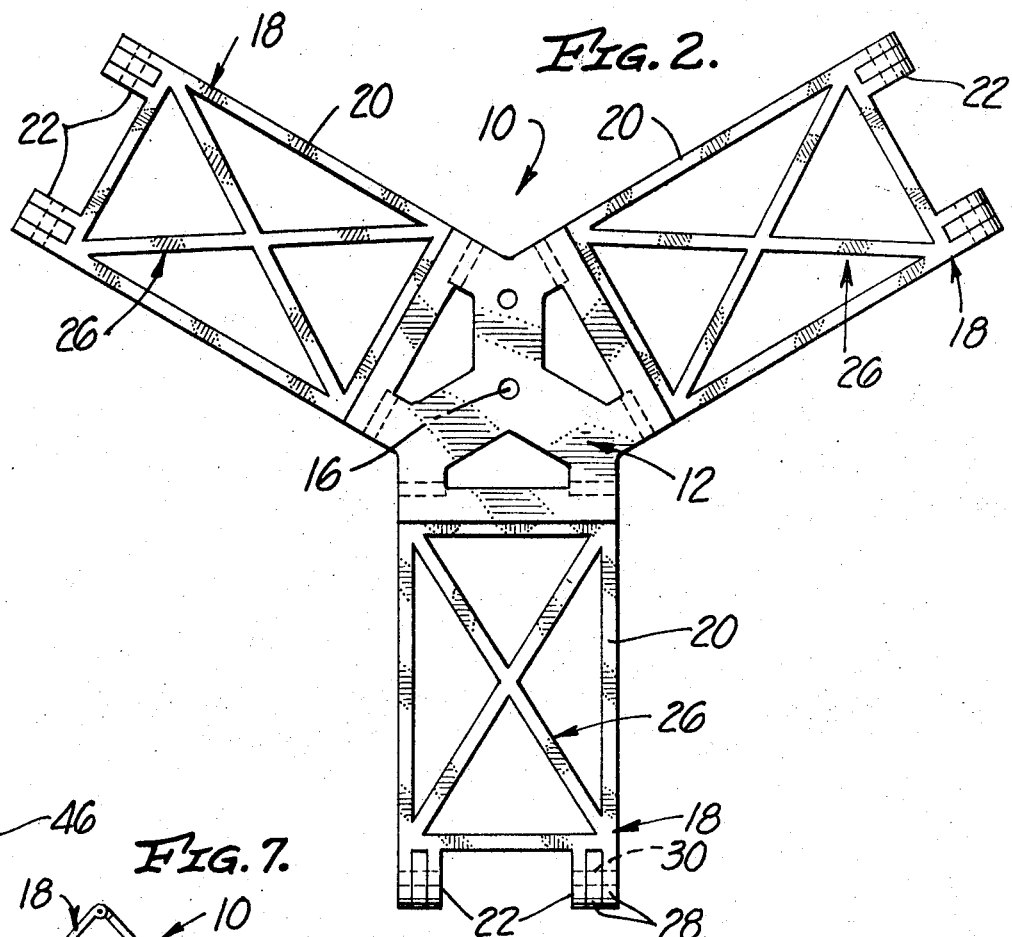
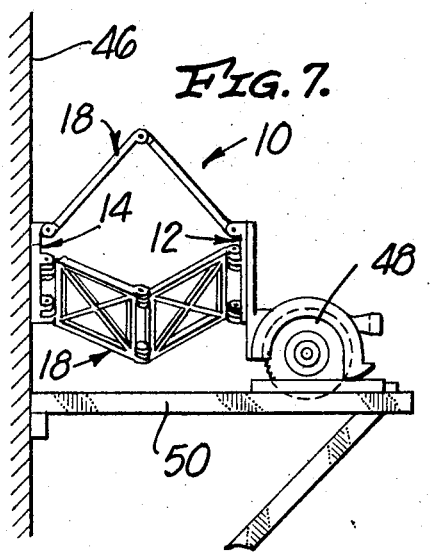

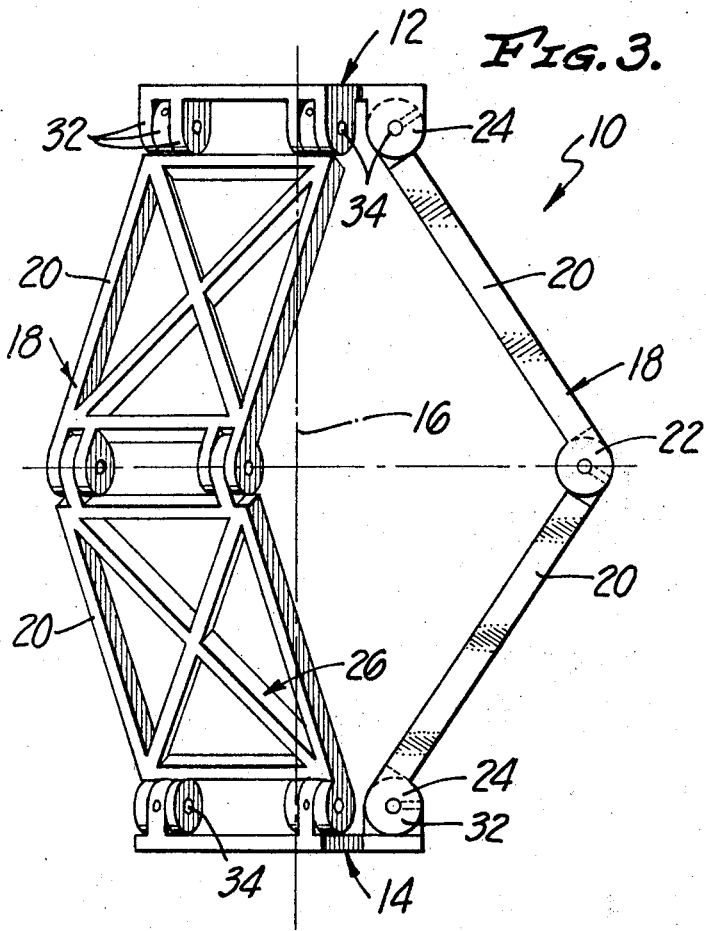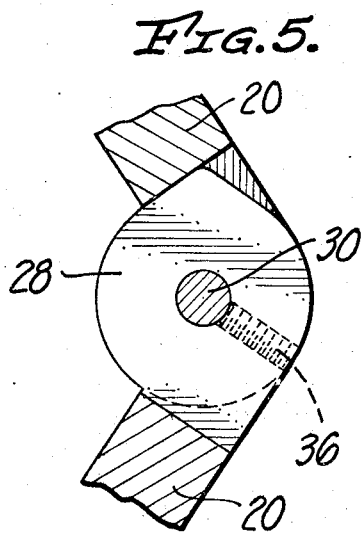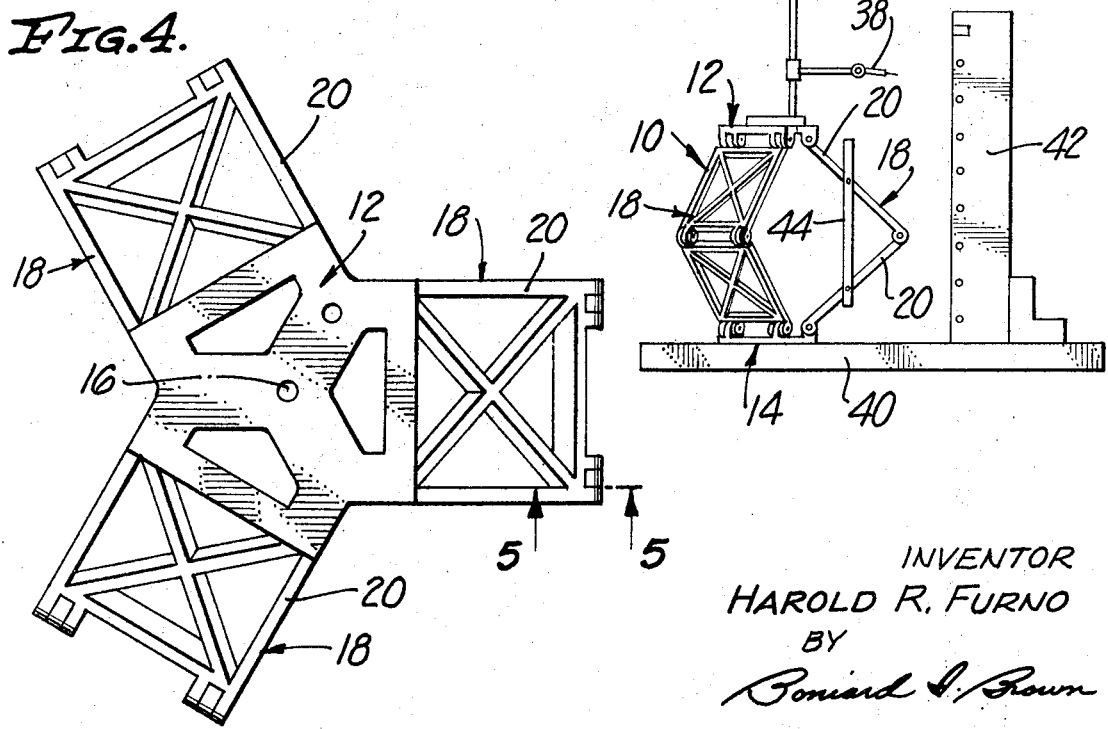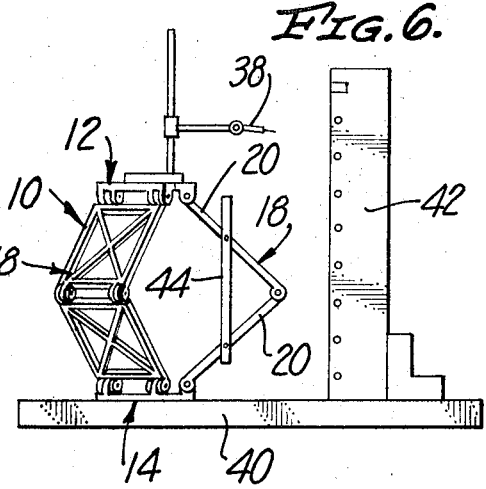

INVENTOR
HAROLD R. FURNO
BY
Ronald G. Brown
ATTORNEY

1

EXTENSIBLE FRAME

This is a continuation of application Ser. No. 73,794 filed Sept. 21, 1970 now abandoned.

BACKGROUND OF THE INVENTION

1. Field of the Invention

This invention relates generally to the field of mechanical frame structures of general application and more particularly to an extensible frame capable of many diverse applications.

2. Discussion of the Prior Art

This invention is concerned with the class of frame structures which comprise articulated links or the like arranged in a manner such that the frame structures may be extended and/or contracted. Examples of such frame structures are found in U.S. Pat. Nos. 156,842; 1,947,647; 2,716,537; 3,053,351; 3,263,430; 3,335,815 and 3,435,570.

Extensible frame structures of the class described may be employed for many different applications. Generally speaking, however, these various applications utilize the frame structures as adjustable or movable supports to adjustably support or position vertically, horizontally, or obliquely.

SUMMARY OF THE INVENTION

The present invention provides a novel articulated frame structure, or frame as it will be hereafter referred to, which is unique in its design, operation, and range of uses. The frame has a pair of rigid end members movable toward and away from one another along a given axis, and three articulated arms extending between and pivotally connected to the end members. The three arms are located in intersecting planes containing the given axis. Each arm has a pair of links with adjacent ends hinged to one another by a central hinge means and end hinge means joining the opposite ends of the arms to the frame end members. The hinge axes of each arm extend normal to the plane of the respective arm. The corresponding hinge axes of the three arms are located in planes normal to the given frame axis.

The frame construction is such that the articulated frame arms permit movement of the frame end members toward and away from one another along the given axis of the frame but positively restrain the members against all other relative movement. In certain of the disclosed inventive embodiments, for example, the end members are parallel plates which remain precisely parallel throughout their range of relative movement toward and away from one another.

The present extensible frame is useful for many diverse applications. Only a very few of these applications are disclosed, however, These disclosed applications are a movable support for a radial saw, and adjustable tool support, and an erectable frame for a building structure.

BRIEF DESCRIPTION OF THE DRAWINGS

FIG. 1 is a side elevation of the present extensible frame in its fully contracted configuration;

FIG. 2 is a top plan view of the frame;

FIG. 3 is a side elevation of the frame in a partially extended configuration;

FIG. 4 is a top plan view of the partially extended frame in FIG. 3;

FIG. 5 is an enlarged section taken on line 5—5 in FIG. 4;

FIG. 6 illustrates the frame used as an adjustable tool support;

FIG. 7 illustrates the frame used as a radial saw support; and

DESCRIPTION OF THE PREFERRED EMBODIMENT

Figure 8:
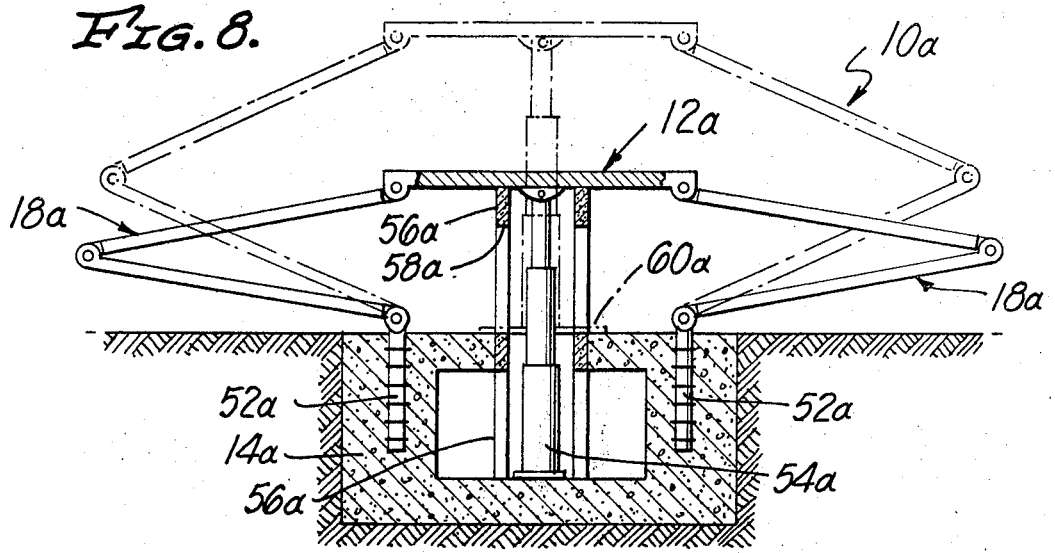
FIGS. 8 and 9 illustrate the frame used as an erectable frame for a building structure.

The illustrated extensible frame 10 of the invention has a pair of rigid end members 12, 14 in the form of generally flat parallel plates. These plates are mirror images of one another and each has three edges arranged at 120° relative to one another, such that each plate has a generally triangular shape. Plates 12, 14 are normal to and are movable toward and away from one another along an axis 16. Extending between the plates are three articulated arms 18 whose longitudinal centerlines are located in planes containing the axis 16 and spaced 120° apart. Each arm comprises two links 20 having adjacent ends pivotally joined by hinge means 22. The ends of each arm are joined to the frame end members or plates 12, 14 by end hinge means 24. The hinge axes of each are extended normal to the plane containing the axis 16 of end plate movement and the longitudinal centerline of the respective arm. Also, the hinge axes of the corresponding hinge means of the three arms are located in common planes normal to the axis 16.

From this description, it will be understood that the frame 10 is extensible and contractable in a manner such that the end plates 12, 14 are movable toward and away from one another along the axis 16 but are restrained against all other relative movement. Accordingly, the end plates remain parallel throughout the range of their relative movement. In the particular inventive embodiment shown, the arm links 20 are all of the same length, such that the end plates are movable toward one another to the fully contracted position of FIG. 1, wherein the plates abut.

Referring in greater detail to the drawings, the links 20 of the articulated arms 18 comprise broad frames 26 having a width equal to the length of the sides of the end frames 12, 14. The central hinge means 22 comprise interfitting tongues 28 on and adjacent longitudinal sides of the link frames 26 and pivot pins 30 joining the tongues. The end hinge means 24 comprise interfitting tongues 32 on the end plates 12, 14 and the link frames 26, adjacent the longitudinal sides of the latter frames, and pivot pins 34 joining the latter tongues. As shown in FIG. 5, the hinge means may have set screws 36 for locking the hinge means against pivotal movement for the purpose of locking the frame 10 in a selected extended position.

As noted earlier, the present extensible frame 10 is capable of many diverse applications. FIGS. 6–9 illustrate three of these applications. FIG. 6 illustrates the frame used as an adjustable support for a tool 38 which, in this instance, is a height gage to be set to a given height above a table 40 with the aid of gage member 42. In this application, the lower end frame plate 14 serves as a base which rests on the table 40. The upper plate 12 serves as a vertically adjustable platform for mounting the height gage 38. A brace 44 is provided which may be adjustably secured between the links 20 of one frame arm 18 for securing the platform 12 at fixed elevation.

FIG. 7 illustrates the present frame 10 used as a movable support for a radial saw. In this case, the frame base 14 is fixed to a wall 46, such that the frame extends and retracts horizontally. A motor driven saw 48 is attached to the movable frame plate 12 for horizontal movement of the saw across a work table 50.

Figure 9:
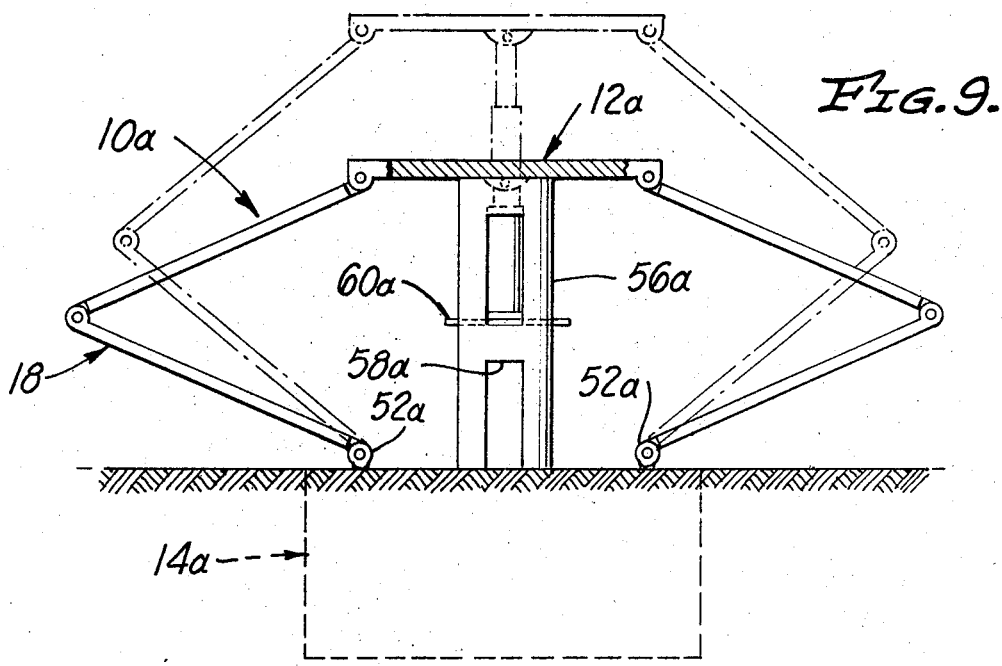

FIGS. 8 and 9 illustrate a modified extensible frame 10a according to the invention for use as an erectable frame of a building structure. Frame 10a is identical to frame 10 except for size and replacement of the base end plate 14 by a sunken concrete foundation 14a to which the lower ends of the frame arms 18a are pivotally attached by lugs 52a embedded in the foundation. Also the upper end of a hydraulic jack 54a is pivotally attached to the underside of the upper frame platform 12a on the central axis of the frame.

In use of the frame 10a, the jack 54a is supported on the foundation 14a, which is recessed to receive the jack, as shown, and the frame platform 12a is raised by the jack to the level of the first or second story of the building to be constructed. A hollow concrete column 56a, having openings 58a, is then poured about the jack and allowed to set sufficiently to support the upper frame platform 12a. The jack 54a is then retracted upwardly and supported on beams 60a extending through the column openings 58a, as shown in FIG. 9. At this point, the upper frame platform 12a is again raised another story or two and another section of the column 56a is poured and allowed to set. This action is repeated until the frame 10a is fully extended. The frame is then reinforced to form the permanent frame of the building structure. The central column 56a forms the elevator shaft and the column openings 58a door ways to the various floors of the completed structure.

What is claimed as new in support of Letters Patent is:

1. An extensible frame comprising:
a pair of rigid parallel end plates movable toward and away from one another along an axis normal to said plates, said plates having inner sides facing one another,
three articulated arms extending between said plates with the longitudinal centerlines of said arms located in intersecting planes, respectively, containing said axis,
each arm including a pair of relatively wide links projecting edgewise a substantial distance beyond either side of the respective arm plane and having adjacent ends and opposite ends, and central hinge means pivotally joining the adjacent link ends on a hinge axis normal to the respective arm plane,
end hinge means pivotally joining the opposite ends of the links of each arm to the adjacent end plates on hinge axes normal to the respective arm plane, the hinge axes of said central hinge means being disposed in a common plane normal to said given axis, the hinge axes of the end hinge means at each end of said arms being disposed in a common plane normal to said given axis, each hinge means comprising a pair of relatively widely spaced hinges located at opposite sides of the respective arm plane adjacent the side edges of the respective arm links and having a common hinge axis, each hinge of each end hinge means comprising a pair of spaced tongues projecting from the inner side of the respective plate, a tongue on the end of the respective arm link positioned between and in sliding contact with said plate tongues, and a pivot pin extending through said tongues, and each hinge of each central hinge means comprising a pair of spaced tongues on one respective arm link, a tongue on the other respective arm link positioned between and in sliding contact with said spaced link tongues, and a pin extending through said link tongues whereby said arms accommodate movement of said plates toward and away from one another along said given axis in a manner such that said plates are restrained against all relative movement with respect to one another except translational movement along said given axis,
said frame being collapsible to a generally flat configuration wherein said plates and said links of each arm abut one another.

2. A frame according to claim 1 wherein:
said end members comprise parallel plates which remain parallel throughout the range of their relative movement along said given axis.

3. A frame according to claim 1 wherein:
said links have a uniform length between their respective hinge axes, whereby said end members are movable toward and into contact with one another.

4. A frame according to claim 1 wherein:
one end member comprises a relatively stationary base and the other end member comprises a relatively movable support movable toward and away from said base.

5. A frame according to claim 4 wherein:
said base is mounted in a fixed generally horizontal position, whereby said support is vertically movable.

6. A frame according to claim 4 wherein:
said base is mounted in a fixed generally vertical position, whereby said support is movable horizontally.

7. A frame according to claim 1 wherein:
each of said arm links comprises a relatively broad frame, and
the link frames of each arm are hinged to one another and to said end members adjacent the longitudinal edges of the link frames.

8. A frame according to claim 1 wherein:
said end members comprise parallel plates which remain parallel throughout the range of their relative movement along said given axis,
said links have a uniform length between their respective hinge axes, whereby said plates are movable toward and into contact with one another,
one plate comprises a relatively stationary base and the other plate comprises a relatively movable support movable toward and away from said base.

9. A frame according to claim 8 wherein:
said base is mounted in a fixed generally horizontal position, whereby said support is vertically movable.

10. A frame according to claim 8 wherein:
said base is mounted in a fixed generally vertical position, whereby said support is movable horizontally.

11. A frame according to claim 1 including:

a fixed support mounting one frame end member for extension and retraction of the other end member toward and away from said fixed support.

12. A frame according to claim 11 wherein:
said fixed support is a vertical wall, whereby said frame extends and retracts horizontally.

13. A frame according to claim 11 including:
a tool such as a saw mounted on said movable end member for movement toward and away from said wall.

14. A frame according to claim 11 wherein: said fixed support is horizontal, such that said frame extends and retracts vertically.

15. A frame according to claim 14 wherein:
said fixed support is a work table, and
a tool supported on said movable end member for vertical adjustment relative to said table.

16. A frame according to claim 14 wherein:
said fixed support is a concrete foundation, and hydraulic jack secured to the underside of said movable end member for elevating the latter member.

* * * * *